United States Patent [19]
Haynes et al.

[11] Patent Number: 5,431,990
[45] Date of Patent: Jul. 11, 1995

[54] SEMI-RIGID, LIGHT WEIGHT FIBER GLASS/POLYMIDE FOAM SANDWICH BLANKET INSULATION

[75] Inventors: Barbara L. Haynes, Seattle; Susana S. Ng, Bothell; Paul M. Serati, Everett; Oktay Yesil, Kent; Eugene A. Jackson, Renton; Samuel M. Lawrence, Seattle, all of Wash.

[73] Assignee: The Boeing Company, Seattle, Wash.

[21] Appl. No.: 223,618

[22] Filed: Apr. 6, 1994

[51] Int. Cl.⁶ .................................. B32B 7/02
[52] U.S. Cl. .................................. 428/218; 244/119; 428/284; 428/285; 428/287; 428/304.4; 428/435; 428/473.5; 428/920
[58] Field of Search .............. 428/218, 285, 287, 284, 428/304.4, 435, 473.5, 920; 244/119, 120

[56] References Cited

U.S. PATENT DOCUMENTS

| | | | |
|---|---|---|---|
| 4,363,883 | 12/1982 | Gagliani et al. | 521/122 |
| 4,780,167 | 10/1988 | Hill | 156/245 |
| 4,915,998 | 4/1990 | Parenti et al. | 428/76 |
| 4,940,112 | 7/1990 | O'Neill | 181/290 |
| 5,079,292 | 1/1992 | Hoffman | 524/862 |

Primary Examiner—James J. Bell
Attorney, Agent, or Firm—Conrad O. Gardner

[57] ABSTRACT

A semi-rigid, light weight insulation blanket is composed of a skeleton having porous cavities sandwiched between layers of fiber glass. The polyimide foam skeleton prevents sagging particularly in crown and upper sidewall areas of an aircraft thereby maintaining a predetermined offset from the skin fuselage reducing corrosion of the primary structure from moisture condensate. This configuration provides similar acoustic performance with reduced weight.

2 Claims, 4 Drawing Sheets

CASE 1 (9 PSI) PRESSURIZED (RUN Nº 3) 767 INTERIOR TRIM & STRUCTURAL PANEL
— □ —     WITH 3 INCHES OF FIBER GLASS INSULATION
          (BASELINE)

(RUN Nº 14) 767 INTERIOR TRIM & STRUCTURAL PANEL
— ⊙ —      WITH NEW "POLYIMIDE FOAM/FIBER GLASS
           SANDWICH" BLANKET.

CASE 2 (0 PSI) UNPRESSURIZED (RUN Nº 2) 767 INTERIOR TRIM & STRUCTURAL PANEL
—□— WITH 3 INCHES OF FIBER GLASS INSULATION
(BASELINE)

(RUN Nº 13) 767 INTERIOR TRIM & STRUCTURAL PANEL
—○— WITH NEW "POLYIMIDE FOAM/FIBER GLASS
SANDWICH" BLANKET.

SEMI-RIGID, LIGHT WEIGHT FIBER GLASS/POLYMIDE FOAM SANDWICH BLANKET INSULATION

FIELD OF THE INVENTION

This invention relates to insulation blankets and more particularly to fiber glass insulation blankets utilized in aircraft interiors and other aerospace applications.

BACKGROUND OF THE INVENTION

The prior patent literature includes U.S. Pat. No. 4,964,936 to Ferro shows open cells of honeycomb core filled with polyimide foam in contrast to the present insulation blanket which incorporates solid panels of polyimide sandwiched in a stacked relationship with layers of fiber glass.

U.S. Pat. No. 5,169,700 to Meier, et al, shows a single layer or multilayer blanket of fibrous material, the fibrous material specified as fiber glass. Each single layer is bonded to an air permeable face sheet. The multilayer blankets are edge-stitched or contained in a heat sealable film. The density of the blanket ranges between 0.2 and 1.5 pounds per cubic foot. In contrast, the present invention utilizes multilayer stackup wherein a core layer of stiffer polyimide foam is sandwiched between layers of fiber glass blankets. The present invention, utilizing the aforementioned combination of materials which possesses different impedances and densities, provides optimum noise transmission loss characteristics in contrast to Meier, et al, based on materials possessing a single density within the stated range.

Various problems have been associated with insulation blankets used in aircraft interiors. Typical problems encountered are as follows:

(a) Under current fabrication methods, fiber glass blankets are covered with mylar and stitched to retain shape. Extensive sewing and/or attachment pins are required to keep the current insulation batting from slumping inside the bagging or face sheet.

(b) Sewing face sheets to batting insulation and taping over the sewn areas are required. Taping is necessary to prevent moisture absorption by capillary action, because moisture absorption goes into the blanket through stitching.

(c) All peripheral and internal cutouts require complex stitching which must be sealed to stop moisture absorption and accumulation thereby adding cost and weight.

(d) Moisture is entrained causing increased insulation weight and water accumulation which causes acoustic and thermal performance degradation.

(e) Maintenance cost to airline customers is high due to the current insulation removal and re-installation practice.

(f) Insulation blankets are typically the single heaviest payloads item, because they cover the entire surface area of the fuselage. Therefore, a small reduction in unit weight achieves very large total weight reduction and improved airplane performance.

BRIEF SUMMARY OF THE INVENTION

The invention disclosed herein describes a design to solve problems normally connected with fiber glass for insulation blankets used in aircraft interiors and other aerospace applications. The hereinafter described insulation concept includes an elastic porous material (a semi-rigid skeleton with porous cavities) such as a polyimide foam or other layer of similar characteristics sandwiched between layers of fiber glass. In an appropriate material composition, sound waves encounter successive different impedances in going through the layers. This improves noise performance or provides similar performance for reduced weight. The new sandwiched insulation is 10 to 15 percent lighter than an all fiber glass blanket configuration and provides comparable noise and thermal performance. In addition, it provides a better combination of lateral stiffness and longitudinal flexibility. This improved combination of stiffness and flexibility allows installation of insulation blankets easier and more securely. Increased stiffness helps to reduce corrosion on the fuselage skin by preventing blankets from coming into contact with the skin. Furthermore, the composite fiber glass foam insulation will be more resistant to moisture absorption and accumulation than current all fiber glass blankets.

The fiber glass polyimide foam composite blanket can be used to replace existing equal-thickness all- fiber glass insulation in aircraft. The material does not slump and will essentially remain in original manufactured shape and density for the airplane life. Under current practice, the fiber glass insulation between structural frames of an aircraft slumps in the circumferential direction. Slumping causes gaps between blanket joints and non-uniform density and thickness distribution which degrades noise and thermal quality of the aircraft interior. In most cases, the degradation of the interior environment occurs without awareness.

The presently described insulation system will also allow easy removal and re-installation of the blanket for corrosion and other inspections as opposed to current fiber glass blanket handling.

DESCRIPTION OF THE PREFERRED EMBODIMENTS

Figure 1:
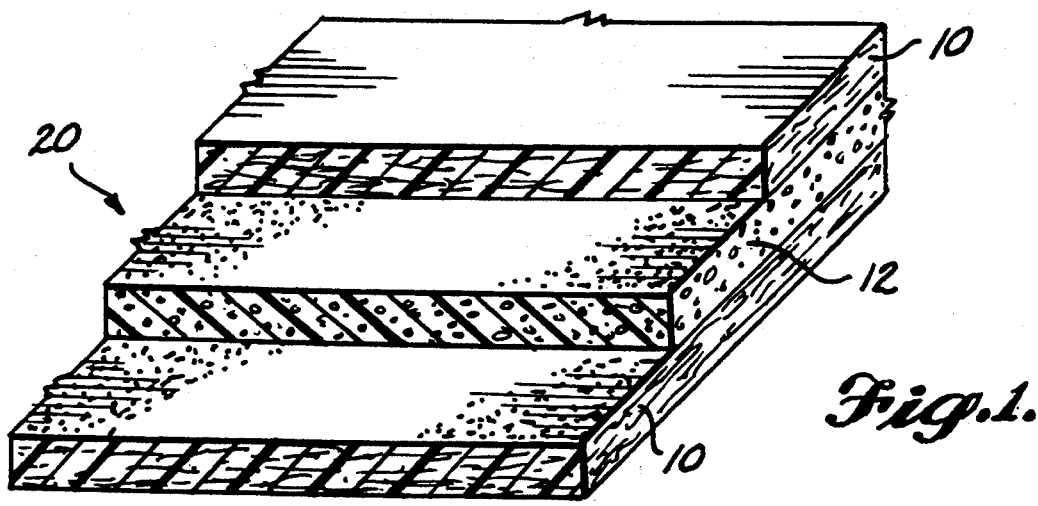
FIG. 1 is a fragmentary perspective view of a portion of an insulation blanket in accordance with a first embodiment of the present invention.
Figure 2:
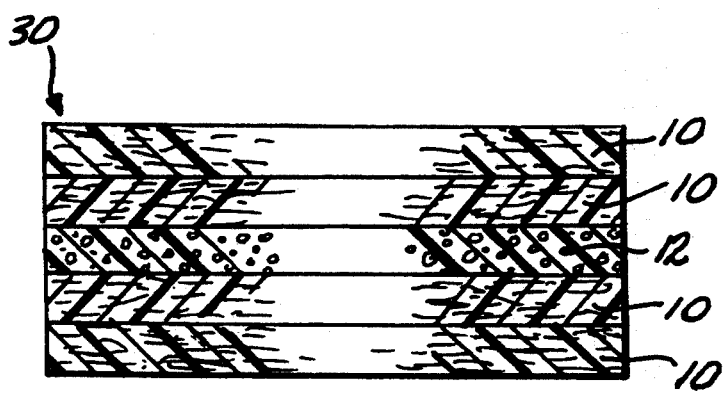
FIG. 2 is a vertical sectional view of a second embodiment of an insulation blanket in accordance with the present invention.
Figure 3:
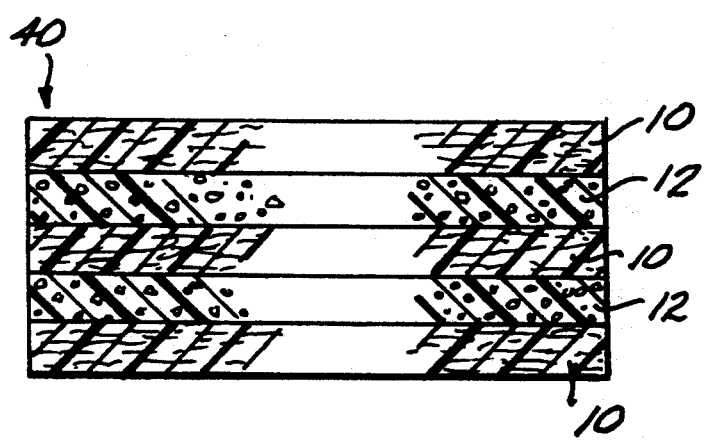
FIG. 3 is a vertical sectional view in accordance with a third embodiment of an insulation blanket in accordance with the present invention.

This invention as exemplified by the embodiments of FIGS. 1, 2, and 3 has been proven to be acoustically effective in laboratory tests for transport aircraft, other aerospace and industry use. Current aircraft insulation blankets are made by adding several layers of a standard thickness (e.g., $\frac{3}{8}$", $\frac{1}{2}$", or 1") of fiber glass batting. The hereinafter described invention utilizes a combination of different materials and densities to optimize the noise transmission loss within the space constraints. The present insulation blanket combines fibrous material (fiber glass or materials of similar characteristics) with polyimide foam in a multi-layer buildup. For example, the center fiber glass layer of the three or five one inch layers of the prior all fiber glass blanket is replaced with one inch (equal thickness) layer of polyimide foam 12 as shown in FIG. 1.

The insulation blanket 20 embodiment of FIG. 1, having a polyimide core 12 sandwiched between outer layers 10 of fiber glass, has an exemplary thickness of about 3 inches. Turning now to the second insulation blanket 30 embodiment of FIG. 2, it can be seen that polyimide core 12 is sandwiched between a plurality of outer layers 10 of fiber glass resulting in an insulation blanket 30 having an overall thickness of about 5 inches, each layer having a thickness of about one inch.

In FIG. 3, an insulation blanket 40 having an overall thickness of five inches is comprised of a core layer 10 of fiber glass sandwiched between a pair of polyimide layers 12 which in turn is sandwiched between a pair of fiber glass outer layers 10.

The aforementioned exemplary embodiments of the invention utilizing variations of polyimide and fiber glass layers, densities, and thicknesses permit optimization of characteristics depending upon the particular application.

Figure 6:
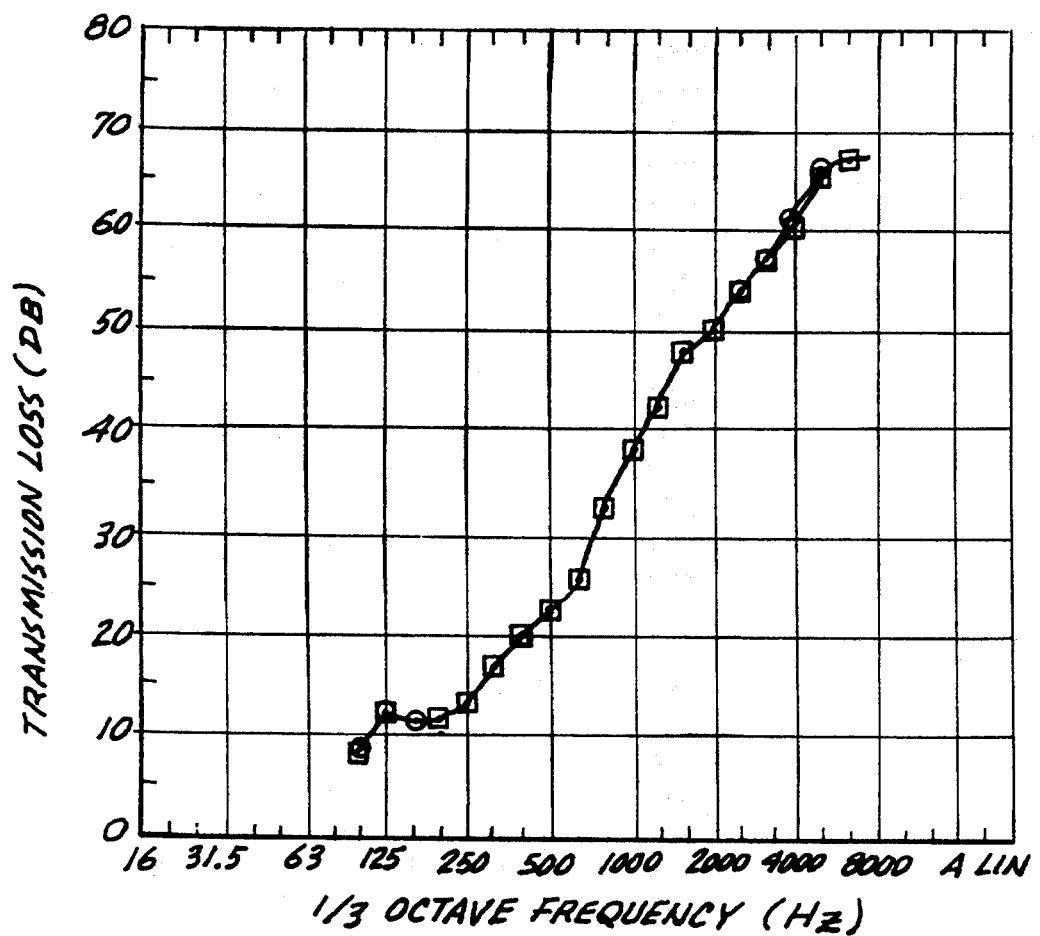
FIG. 6 is a graph illustrating a noise transmission loss comparison of the present fiber glass and polyimide foam insulation blanket with a prior fiber glass insulation blanket under pressurized conditions.
Figure 7:
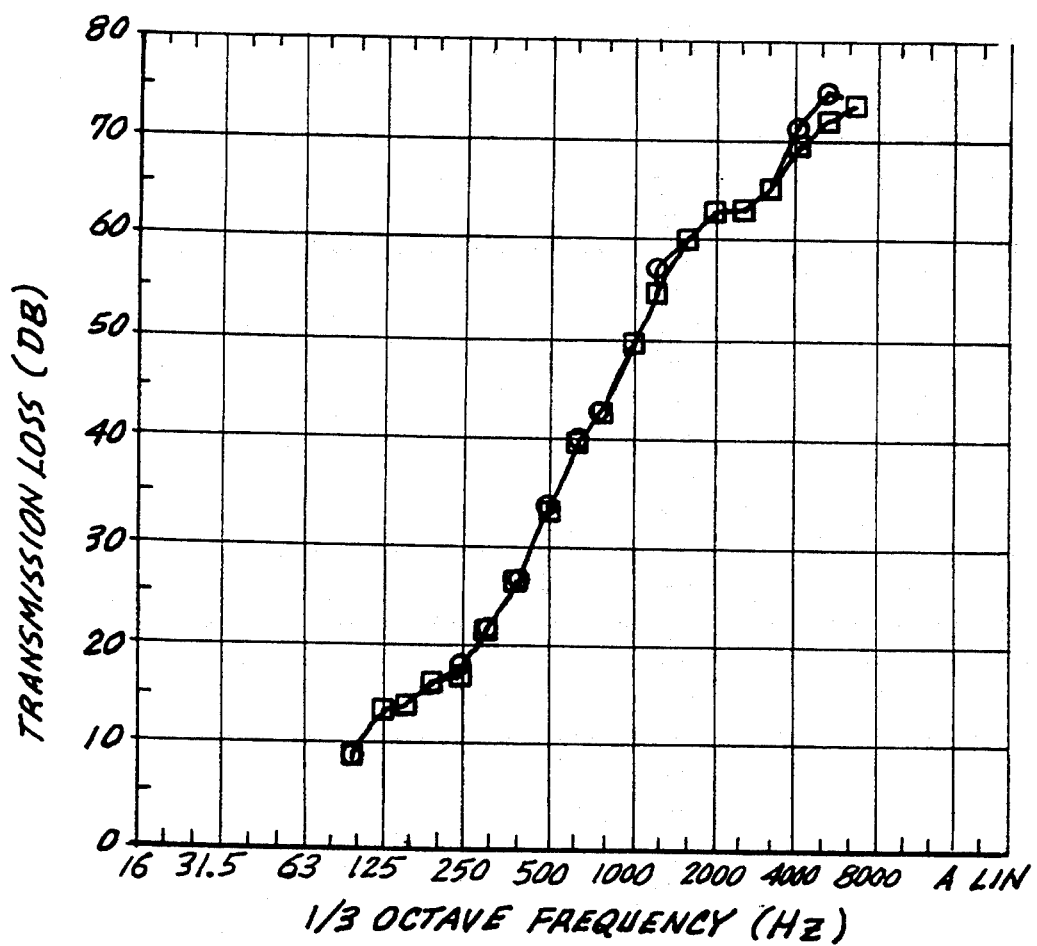
FIG. 7 is a graph similar to the graph of FIG. 6 except the transmission loss was obtained under unpressurized conditions.

The advantages of utilizing the present light weight configurations for improving present insulation blanket slumping, moisture absorption, installation, and cost problems are summarized in the following:

1. The polyimide type foam adds rigidity to blankets which makes installation easier and will result in few attachment points, clips, pins, clamps, stitching, taping, etc. used to secure the material and batting. This reduces installation cost and material weight.
2. Polyimide foam adds lateral stiffness of the insulation which will hold the blanket in place between frames without forcing it to bulge out. In other words, foam helps to prevent the insulation blanket from sagging particularly in crown, upper and lower deck sidewall areas, pressure dome, pressure bulkhead, and floor panel of an airplane.
3. Material slump due to fatigue, gravity, vibration, pressure, etc., is controlled requiring less stitching to attach insulation covering.
4. The fiber glass foam sandwich configuration allows the blanket to conform to the curvature of the fuselage without distorting the insulation batting due to the combination of the foam's longitudinal flexibility and lateral stiffness.
5. The new sandwich configuration is conducive to maintaining a consistent blanket offset from the skin fuselage, thereby reducing corrosion of the primary structure from moisture condensate.
6. The composite insulation will have much better weight (light), rigidity, strength, flexibility, handling characteristics, fire retardation, and water repellency than a corresponding equal-thickness all fiber glass insulation due to presence of the polyimide foam.
7. As demonstrated (FIGS. 6 and 7, with and without pressurization test conditions, respectively), the three inch thick fiber glass polyimide foam sandwich blanket configuration, with 12.5 percent less weight than the same thickness all fiber glass insulation, will have equal or better acoustic performance.
8. Equal-thickness replacement of one layer fiber glass with polyimide foam will not change the current blanket handling and fabrication processes. In addition, the configuration of an airplane sidewall system (e.g., the spacing between the structural frame outboard mold line and trim panel inboard mold line) does not have to be changed for the new insulation blanket which means that the sandwich blankets can be installed in current airplanes.

Figures 4A, 4B:
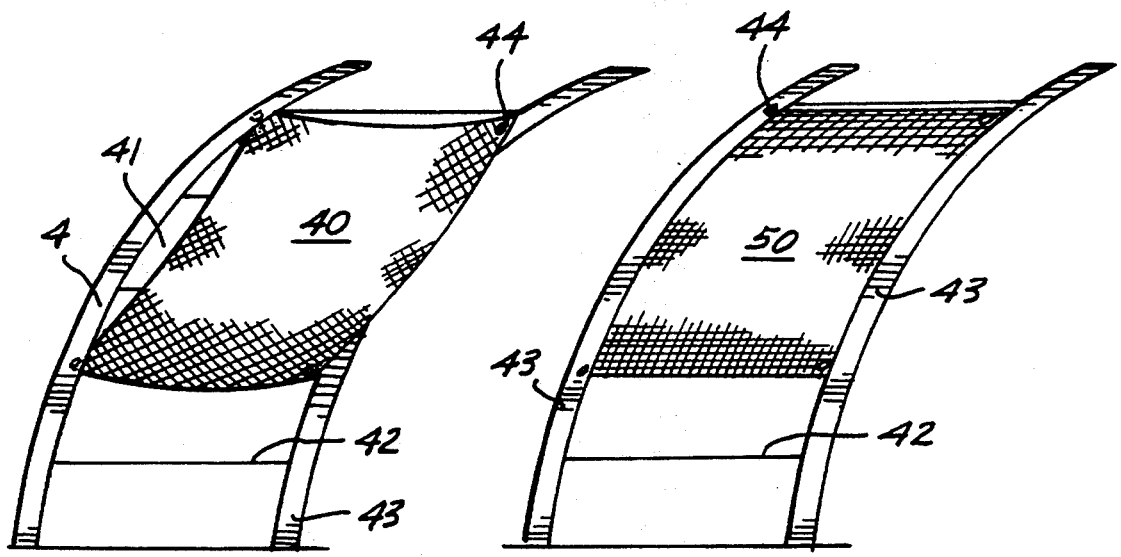
FIG. 4A is a perspective view of a prior fiber glass insulation blanket showing sagging with respect to aircraft stringer and frame structure.
FIG. 4B is a perspective view of the present fiber glass and polyimide foam sandwich insulation blanket illustrative of reduced sagging with respect to aircraft stringer and frame structure.

FIG. 4A illustrates inboard sagging of prior all fiber glass insulation blankets 40 (upper sidewall, crown, pressure dome, and bulkhead) which produces gaps 41. Such fiber glass blankets 40 also sag outboard (lower deck) resulting in possible contact of the blanket with the skin. Stringer 42, and frame 43 aircraft structure is shown together with exemplary attachment points 44. In comparison, FIG. 4B shows the present supporting polyimide foam and fiber glass sandwich insulation blanket 50 utilized in an aircraft structure to reduce sagging.

Figures 5A, 5B:
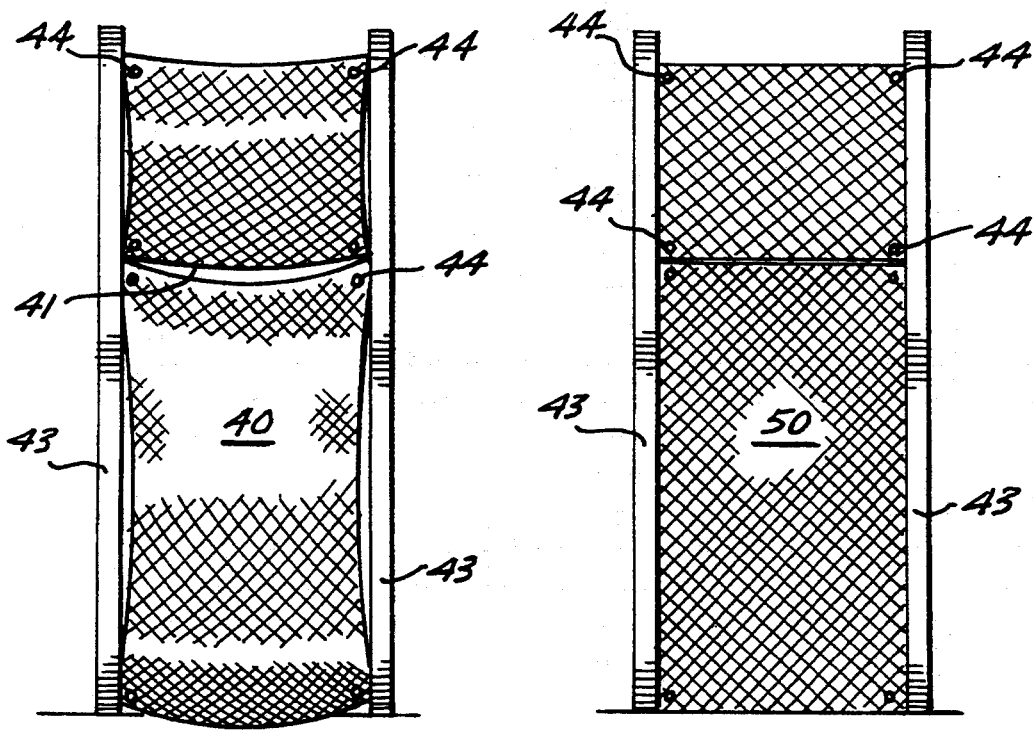
FIG. 5A is a pictorial view of a prior fiber glass insulation blanket showing slumping between blanket and frame and adjoining blankets.
FIG. 5B is a pictorial view of the present fiber glass and polyimide foam insulation blanket illustrative of reduced slumping.

A further example of fiber glass blanket 40 slumping is shown in FIG. 5A where the fibers slump toward the bottom of the insulation blanket thereby reducing the effectiveness of the insulation. Compare FIG. 4B where the present polyimide foam and fiber glass sandwich structured insulation blanket 50 results in minimized slump.

What is claimed:

1. An aircraft insulation blanket comprising in combination:
   a sandwich structure composes of a plurality of layers including a core layer having a density of about 0.3 lb/ft$^3$ and the outer of said plurality of layers having a density of about 0.42 lb/ft$^3$.
2. The aircraft insulation blanket according to claim 1 wherein said core layer comprises a polyimide foam layer having a thickness of about one inch.

* * * * *